Jan. 10, 1967  A. VIOL  3,297,119
CONVERTIBLE SHOULDER BAG
Filed Oct. 23, 1964  2 Sheets-Sheet 1

INVENTOR
Arya Viol
BY
Kenric, Edmonds, Morton, Taylor & Adams
ATTORNEYS

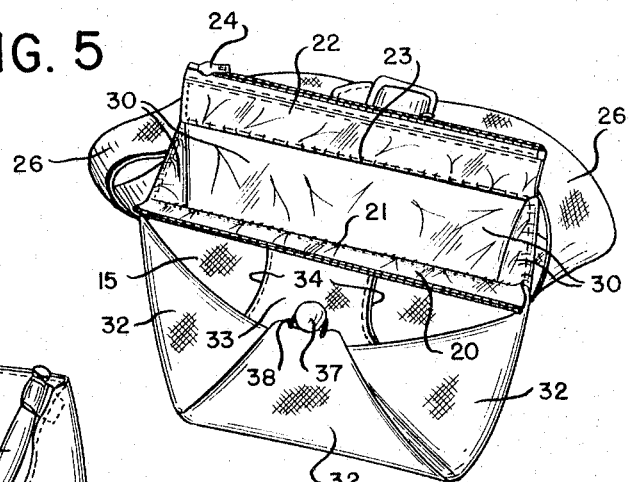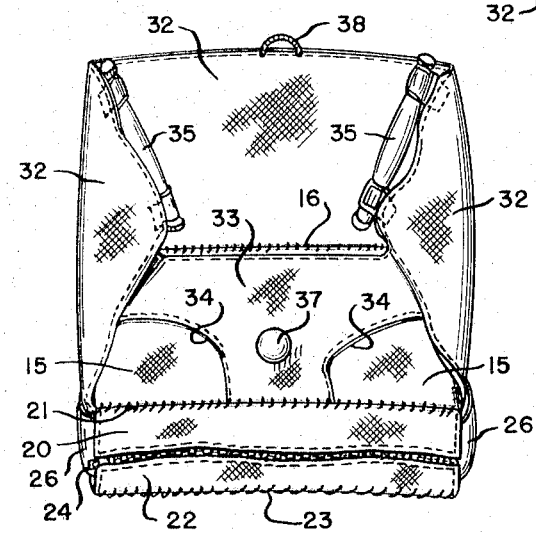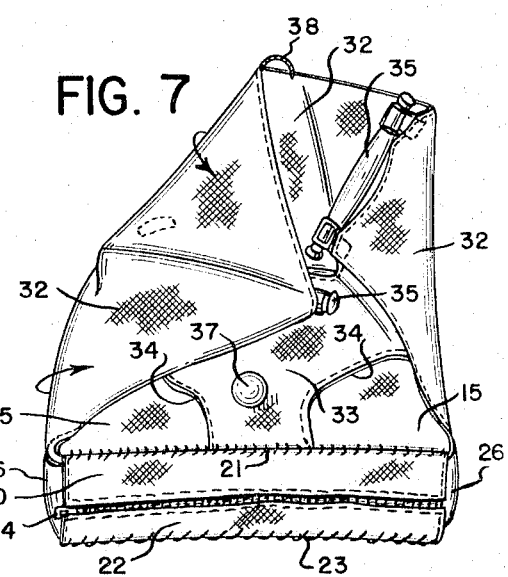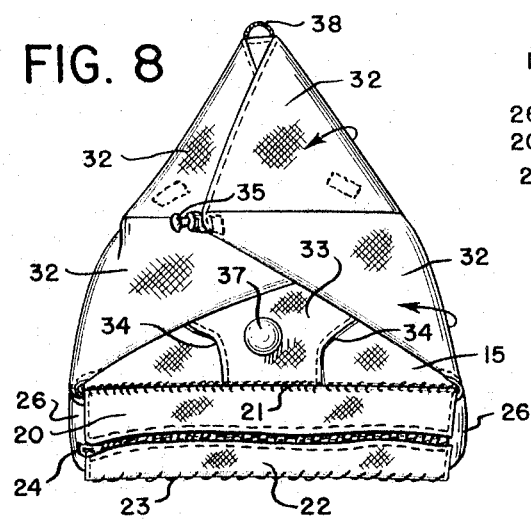

United States Patent Office 3,297,119
Patented Jan. 10, 1967

3,297,119
CONVERTIBLE SHOULDER BAG
Arya Viol, 1217 15th St., Fort Lee, N.J. 07024
Filed Oct. 23, 1964, Ser. No. 406,111
4 Claims. (Cl. 190—8)

This invention relates to a combined tote bag and infant's seat and more particularly to a carrying or tote bag of the shoulder type which is quickly and easily convertible into an infant's seat of the breeches-buoy type.

It is the object of this invention to provide a shoulder bag, or tote bag of the shoulder type, in which can be carried an infant's paraphernalia such as bottles, clothing, toys and the like, and further to provide a sturdy infant's seat of the type which resembles a breeches buoy, the seat being adapted to be carried by hand, or to be attached to the seat of an automobile or mounted on a conventional chair to convert it to an infant's highchair. It is a further object of this invention to provide a tote bag which can be quickly converted into an infant's seat of the type described, the combined tote bag and infant's seat being herein referred to for the sake of convenience as a convertible shoulder bag.

My new combined tote bag and infant's seat or convertible shoulder bag, comprises a combined seat and bag portion and a so-called breeches portion. The seat and bag portion of the combination comprises a U-shaped side wall member, a top member secured to the upper periphery of the wall member and a bottom member secured to the lower periphery of the wall member, said top member, wall member and bottom member together forming a U-shaped bag having an open front. The open front of the U-shaped bag is provided with a front closure member that is hingeably secured to at least one front edge of the bag and is adapted to close the open front thereof. The bag is further provided with a carrying strap secured to the side wall of the bag adjacent the open front thereof. The breeches portion of the combination comprises a side and back panel the lower edge of which is secured to the upper peripheral or side edge of the U-shaped bag, and a front panel the lower edge of which is secured to the upper front edge of the U-shaped bag. The front panel is formed with openings adapted to receive the legs of an infant seated on the top member of the U-shaped bag. The wall member and top member of the seat and bag portion are formed of materials having sufficient strength and rigidity to support the weight of an infant seated on the top member, and both the side and back panel and the front panel of the breeches portion are formed of a pliant foldable material.

In an advantageous embodiment of the convertible shoulder bag of my invention, the upper edge of the side and back panel of the breeches portion is provided with carrying handles to permit it to be carried by hand. Moreover, the interior of the U-shaped bag is advantageously lined with a heat insulating material and further is advantageously lined with a waterproof material.

My new convertible shoulder bag will be better understood from the following description thereof in conjunction with the accompanying drawings of which:

FIG. 5 is a perspective view again showing the front closure members of the bag portion open to receive infant's paraphernalia; and FIGS. 6, 7 and 8 are perspective views of the bag showing the successive steps involved in folding the breeches portion thereof onto the upper surface of the seat.

Figure 1:
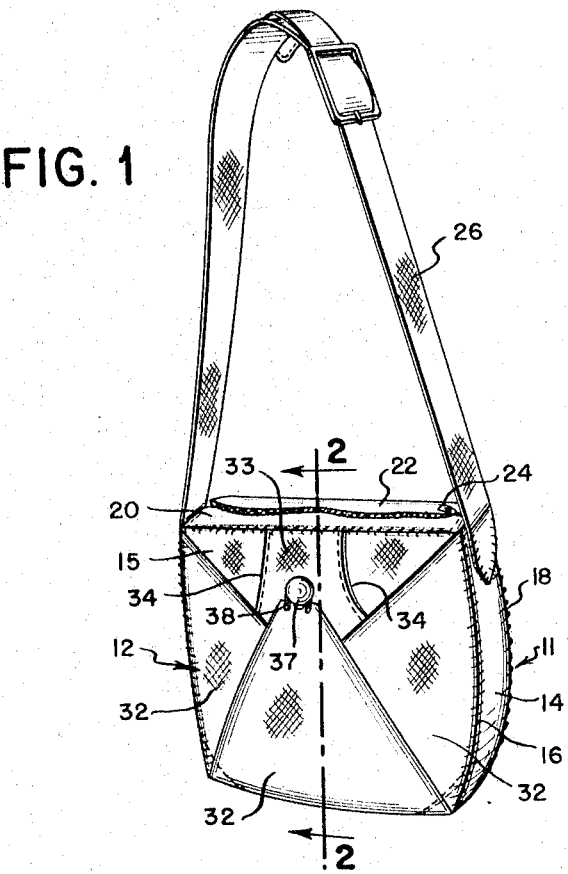
FIG. 1 is a perspective view of the shoulder bag showing the breeches seat portion thereof in its folded position.

As shown best in FIGS. 1, 2 and 3, my novel convertible shoulder bag comprises a U-shaped seat and bag portion 11 (hereinafter referred to for the sake of convenience simply as the bag or bag portion of the device) and a foldable breeches portion 12.

The bag portion 11 comprises a U-shaped side wall member 14, a top member 15 secured to the upper peripheral edge 16 of the side wall member 14, and a bottom member 17 secured to the lower peripheral edge 18 of the side wall member 14. The side wall member 14, top member 15 and bottom member 17 together form a U-shaped bag having an open front end best shown in FIG. 5.

The open front of the U-shaped bag is provided with a front closure member that is hingeably connected to at least one front edge of the bag, the front closure member being adapted to close the open front of the U-shaped bag. In the embodiment of my convertible bag shown in the drawing the front closure member comprises an upper flap 20 secured to the upper front edge 21 of the bag and a lower flap 22 secured to the lower front edge 23 of the bag, the two flaps 20 and 22 being detachably secured together by a conventional separable zipper 24. The bag is also provided with a shoulder or carrying strap 26 advantageously secured to the side wall member 14 adjacent the front opening of the bag.

Figure 2:
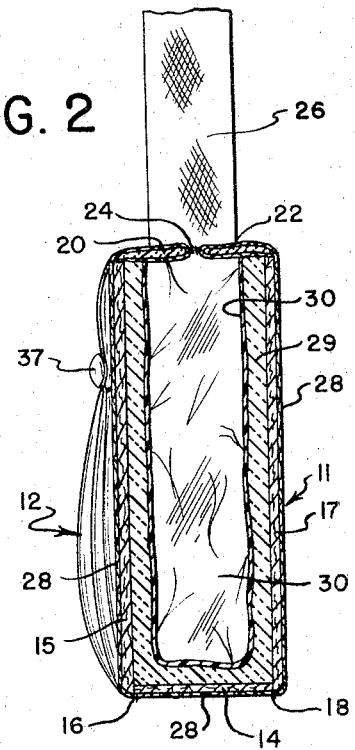
FIG. 2 is a sectional view along lines 2—2 of FIG. 1 showing the interior construction of an advantageous embodiment of the shoulder bag.
Figure 3:
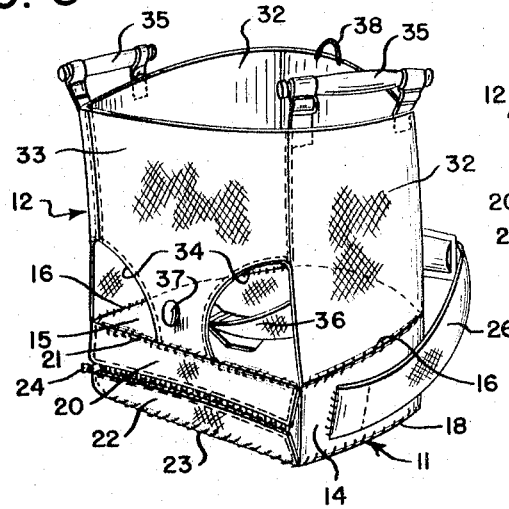
FIG. 3 is a perspective view of the convertible bag showing the breeches seat portion thereof in its erected position ready to receive an infant.

It is important that the side wall member 14 and the top member 15 be sufficiently strong and rigid to support the weight of an infant seated on the top member when the bag portion 11 is resting on a horizontal surface as shown in FIG. 3. The side wall and top members may be of a composite construction comprising, for example, a metal or wooden frame covered with side and top panels of plastic, fiberboard, thin plywood, cloth, webbing or the like. In the embodiment of my invention shown in section in FIG. 2 of the drawing, the side wall member 14, the top member 15 and bottom member 17 are formed of sheets or panels of a relatively thin, stiff sheet material such as plastic, thin plywood or wood veneer, metal or the like, the exterior of the side, top and bottom panels being covered with a layer 28 of protective and decorative cloth or similar material and the interior of the side, top and bottom panels being provided with an intermediate lining 29 of padding or heat insulating material and an inner lining 30 of a water resistant material. As previously noted, the side wall member 14, top member 15, and bottom member 17 together form a U-shaped bag portion 11 having a front opening as shown best in FIG. 5, the bag having hinged closure flaps 20 and 22 and advantageously being provided with a padded, water resistant lining 30.

The foldable breeches portion 12 of my convertible shoulder bag comprises a side and back panel 32 secured to the upper peripheral edge 16 of side wall member 14 (which is coextensive with the upper peripheral edge of the U-shaped bag), and a front panel 33 secured to the upper front edge 21 of the front opening of the bag. The front panel 33 is formed with leg openings 34 adapted to receive the legs of an infant seated on the top member 15 of the bag, and both the side and back panel 32 and the front panel 33 are made of a foldable material such as cloth, pliant plastic or the like. The side and back panel 32 is advantageously provided with a pair of carrying handles 35 secured to the upper edge thereof, and also advantageously with a safety strap or seat belt 36 secured to the inner surface thereof as shown best in FIG. 3. The beeches portion 12 is also provided with means such as the button 37 and eyelet 38 for securing the foldable panels 32 and 33 in their folded position. Moreover, the breeches portion is advantageously provided with means for suspending the breeches seat from the back rest of an automobile seat in order to obtain an infant's car seat of the familiar type.

The combined tote bag and infant's seat of my invention is an exceedingly versatile and useful device. When the breeches seat portion 12 is folded flat against the top top member 15 as shown best in FIG. 1, the device may be used as a shoulder bag or tote bag that is particularly well adapted to carry such infant's paraphernalia as clothing, bottles, toys and the like. The bag is provided with a convenient closure member that allows ready access to the interior thereof as shown best in FIG. 5, and the strap 26 facilitates carrying the bag on the user's shoulder.

Figure 4:
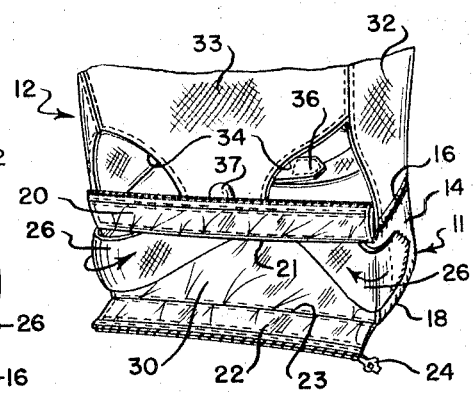
FIG. 4 is a fragmentary perspective view showing the front closure member of the bag portion open to receive the carrying straps.

When the breeches seat portion 12 is unfolded and erected as shown in FIG. 3, the device can be used as an infant's breeches-buoy type seat that can be carried by hand by means of the handles 35 or that can be placed on any horizontal surface such as the seat of a conventional chair. When the seat is carried by the handles 35, the strap 26 is advantageously tucked into the interior of the bag portion 11 as indicated in FIG. 4. When the seat is placed on a conventional chair, the strap 26 is advantageously placed about the straight back of the chair in order to hold the device securely on the chair as indicated in FIG. 3.

When it is desired to convert the device from the breeches-type seat shown in FIG. 3 into the shoulder bag shown in FIG. 1, the front panel 33 of the breeches seat portion 12 is folded flat against the outside surface of the top member 15 of the bag portion 11 as shown in FIG. 6. One side of the side and back panel 32 is then folded flat on top of the front panel as shown in FIG. 7, and then the other side of the panel 33 is folded flat as shown in FIG. 8. Finally, the back of the panel 33 is folded as indicated in FIG. 8, the strap 26 is removed from the interior of the bag, and the button 37 is engaged in the eyelet 38 to obtain the neat convertible shoulder bag shown in FIG. 1.

To facilitate folding of the breeches portion of the device as just described, the height of the front panel 33 should be no greater than the distance from the front edge 21 of the bag 11 to the opposite or rearward edge of the bag, and the height of the side and back panel 32 should be no greater than the distance from one side edge of the bag 11 to the opposite side edge thereof.

From the foregoing description of my new convertible shoulder bag, it will be seen that I have made an important contribution to the art to which my invention relates.

I claim:
1. A combined tote bag and infant's breeches-type seat which comprises a combined seat and bag portion and a breeches portion; said seat and bag portion comprising a U-shaped wall member, a top member secured to the upper peripheral edge of said wall member an a bottom member secured to the lower peripheral edge of said wall member, said top member, wall member and bottom member together forming a U-shaped bag having an open front, said wall member and top member being formed of materials having sufficient strength and rigidity to support the weight of an infant, seated on said top member, said bag being provided with a front closure member hingeably secured to at least one front edge of the U-shaped bag and adapted to close the open front thereof, and also with a carrying strap; said breeches portion comprising a side and back panel the lower edge of which is secured to the upper peripheral edge of the U-shaped bag, and a front panel the lower edge of which is secured to the upper front edge of the U-shaped bag, the front panel being formed with openings adapted to receive the legs of an infant seated on the top member of the U-shaped bag, and both the side and back panel and the front panel being formed of a pliant foldable material.

2. The combined tote bag and seat according to claim 1 in which the upper edge of the side and back panel of the breeches portion is provided with carrying handles.

3. The combined tote bag and seat according to claim 1 in which the seat and bag portion is lined with a heat insulating material.

4. The combined tote bag and seat according to claim 1 in which the seat and bag portion is lined with a waterproof material.

References Cited by the Examiner
UNITED STATES PATENTS

| | | | |
|---|---|---|---|
| 1,549,647 | 8/1925 | Worthington | 190—8 |
| 1,569,045 | 1/1926 | Sommer | 297—183 |
| 1,767,925 | 6/1930 | Hargreaves | 190—8 |

FRANKLIN T. GARRETT, *Primary Examiner.*